(12) United States Patent
Zhang et al.

(10) Patent No.: US 11,256,060 B2
(45) Date of Patent: Feb. 22, 2022

(54) LENS MODULE AND ELECTRONIC DEVICE INCLUDING THE SAME

(71) Applicant: TRIPLE WIN TECHNOLOGY(SHENZHEN) CO.LTD., Shenzhen (CN)

(72) Inventors: Long-Fei Zhang, Guangdong (CN); Shin-Wen Chen, New Taipei (TW); Yu-Shuai Li, Shenzhen (CN); Kun Li, Guangdong (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 261 days.

(21) Appl. No.: 16/504,545

(22) Filed: Jul. 8, 2019

(65) Prior Publication Data

US 2020/0285018 A1 Sep. 10, 2020

(30) Foreign Application Priority Data

Mar. 5, 2019 (CN) .......................... 201910165518.3

(51) Int. Cl.
*G02B 7/02* (2021.01)
*G02B 7/00* (2021.01)
(Continued)

(52) U.S. Cl.
CPC ............ *G02B 7/023* (2013.01); *G02B 7/003* (2013.01); *G02B 7/006* (2013.01); *G02B 7/021* (2013.01);
(Continued)

(58) Field of Classification Search
CPC . G02B 7/00; G02B 7/02; G02B 7/023; G02B 7/003; G02B 7/006; G02B 7/021; G02B 7/022; G02B 7/1815; G02B 27/00; G02B 27/0018; G02B 27/0006; G02B 13/00; G02B 13/0015; G02B 13/18;
(Continued)

(56) References Cited

U.S. PATENT DOCUMENTS

2010/0149410 A1* 6/2010 Matsuzawa ............. H01L 23/10
348/374

FOREIGN PATENT DOCUMENTS

CN 202362521 U 8/2012
CN 207443016 U 6/2018

OTHER PUBLICATIONS

English translation of CN 207443016, machine translated on Mar. 30, 2021. (Year: 2018).*

* cited by examiner

*Primary Examiner* — Jie Lei
(74) *Attorney, Agent, or Firm* — ScienBiziP, P.C.

(57) ABSTRACT

A lens module relieved against the build-up of working heat and any condensation by allowing the release of same comprises a circuit board, a support base, and an optical filter. The support base is fixed on a first surface of the circuit board. The support base defines a through hole configured to receive the optical filter. The support base further defines at least one gas pressure relieving structure. The optical filter and the circuit board seal opposite sides of the support base to form a receiving space. The gas pressure relieving structure allows communication between the receiving space and the exterior such that heat generated in the receiving space is transported out. The lens module is dustproof, waterproof, and can breathe. An electronic device including the lens module is also disclosed.

16 Claims, 6 Drawing Sheets

(51) Int. Cl.
   *G02B 27/00* (2006.01)
   *H04N 5/225* (2006.01)
   *G03B 17/08* (2021.01)
(52) U.S. Cl.
   CPC .......... *G02B 27/0006* (2013.01); *G03B 17/08* (2013.01); *H04N 5/2254* (2013.01)
(58) Field of Classification Search
   CPC .......... G02B 6/44; G02B 6/4427; G02B 5/20; G03B 17/08; G03B 17/12; G03B 11/00; G03B 11/041; H04N 5/225; H04N 5/2252; H04N 5/2253; H04N 5/2254; H04N 5/374; H05K 1/18; H05K 1/02; H05K 1/0203; H05K 1/0274; H05K 1/181
   USPC ........ 359/507, 511–513, 723, 819, 826, 827, 359/830
   See application file for complete search history.

LENS MODULE AND ELECTRONIC DEVICE INCLUDING THE SAME

FIELD

The subject matter herein generally relates to optical devices, and more particularly to a lens module and an electronic device including the same.

BACKGROUND

A lens module usually includes a lens, a lens base, a support base, an optical filter, a photosensitive chip, and a circuit board. To prevent external impurities from entering the lens module and affecting the image quality, a gas pressure relieving hole defined on the surface of the support base is sealed with glue, after the cover lens (LHA) process, to completely seal the space under the support base. However, if heat generated by the lens module is not released, a temperature difference between the inner and outer surface of the filter may cause condensation of water mist or small droplets on the internal surface of the filter, which seriously affects the imaging quality of the lens module.

BRIEF DESCRIPTION OF THE DRAWINGS

Implementations of the present technology will now be described, by way of embodiment, with reference to the attached figures.

DETAILED DESCRIPTION

Figure 1:
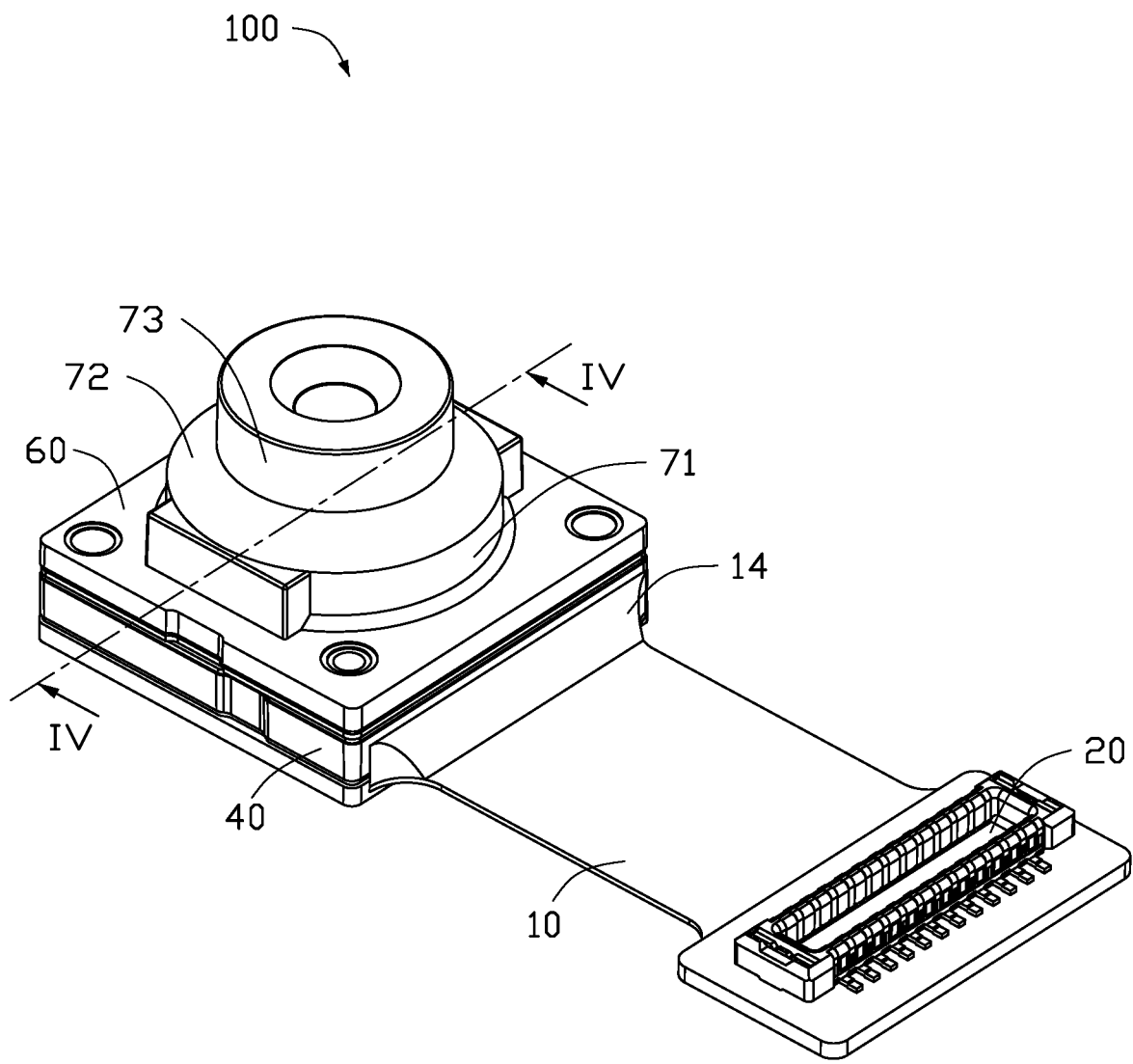
FIG. 1 is an isometric view of an embodiment of a lens module.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

Figure 2:
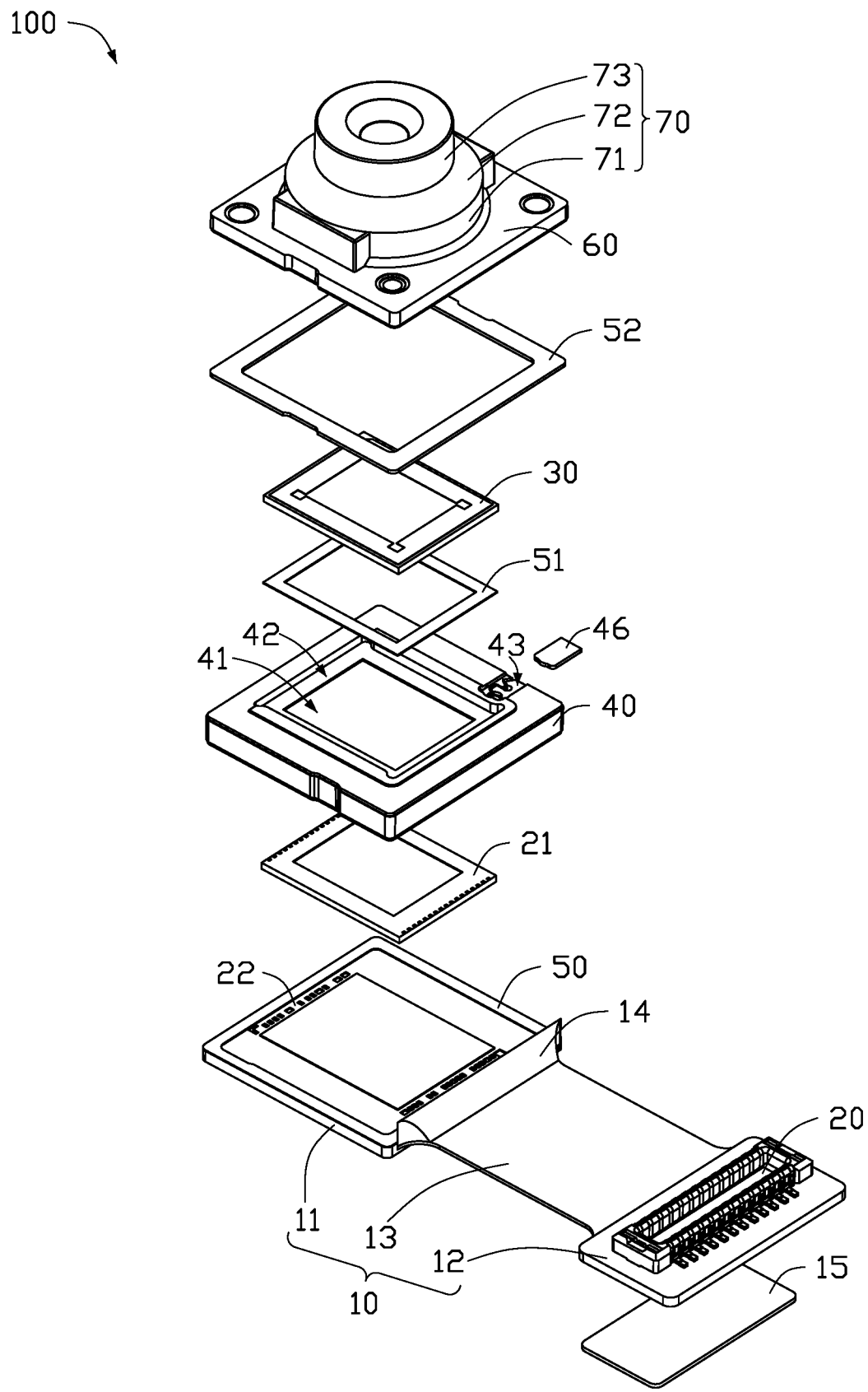
FIG. 2 is an exploded, isometric view of the lens module of FIG. 1.
Figure 3:
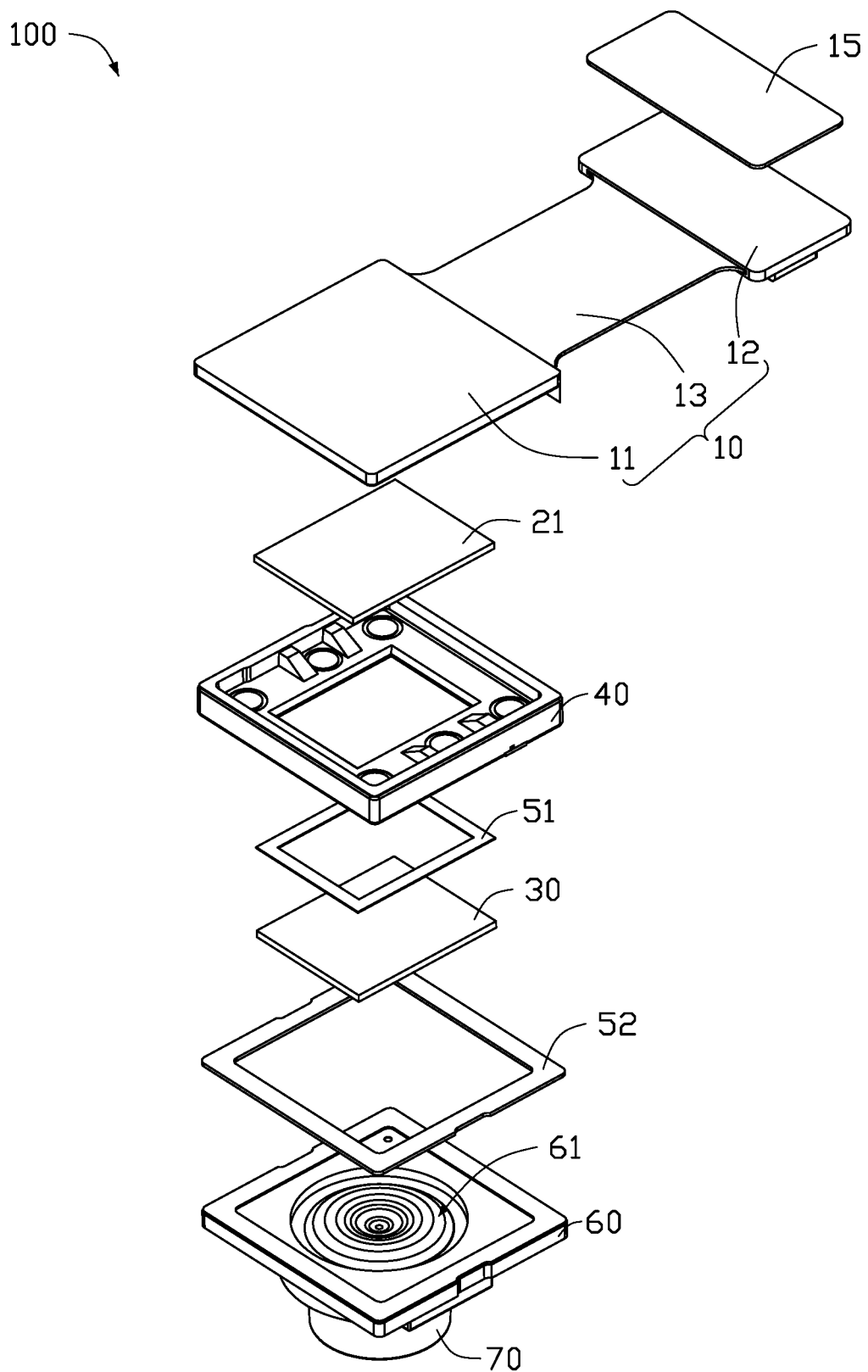
FIG. 3 is similar to FIG. 2, but viewed from another angle.

FIGS. 1-3 illustrate a lens module 100 comprising a circuit board 10, an optical filter 30, a support base 40, a lens base 60, and a lens 70.

The circuit board 10 is a flexible board, a hard board, or a rigid-flexible board. In an alternative embodiment, the circuit board 10 is a rigid-flexible board, and comprises a first hard board portion 11, a second hard board portion 12, and a flexible board portion 13 located between the first hard board portion 11 and the second hard board portion 12. A first surface of the second hard board portion 12 carries an electrical connecting portion 20. When the lens module 100 is applied in an electronic device (not shown), the electrical connecting portion 20 realizes signal transmission between the lens module 100 and other components of the electronic device. The electrical connecting portion 20 may be golden fingers or other connector. A second surface of the second hard board portion 12 carries a first reinforcement 15. The material of the first reinforcement 15 is metal, such as stainless steel.

A photosensitive chip 21 and a plurality of electric elements 22 are mounted on a first surface of the first hard board portion 11. The photosensitive chip 21, the plurality of electronic elements 22, and the electrical connecting portion 22 are located on the same surface of the circuit board 10. The photosensitive chip 21 is in a shape of rectangle. Each electronic element 22 can be a passive or other element, such as a resistor, a capacitor, a diode, a triode, a relay, or a live erasable programmable read only memory (EEPROM).

Figure 4:
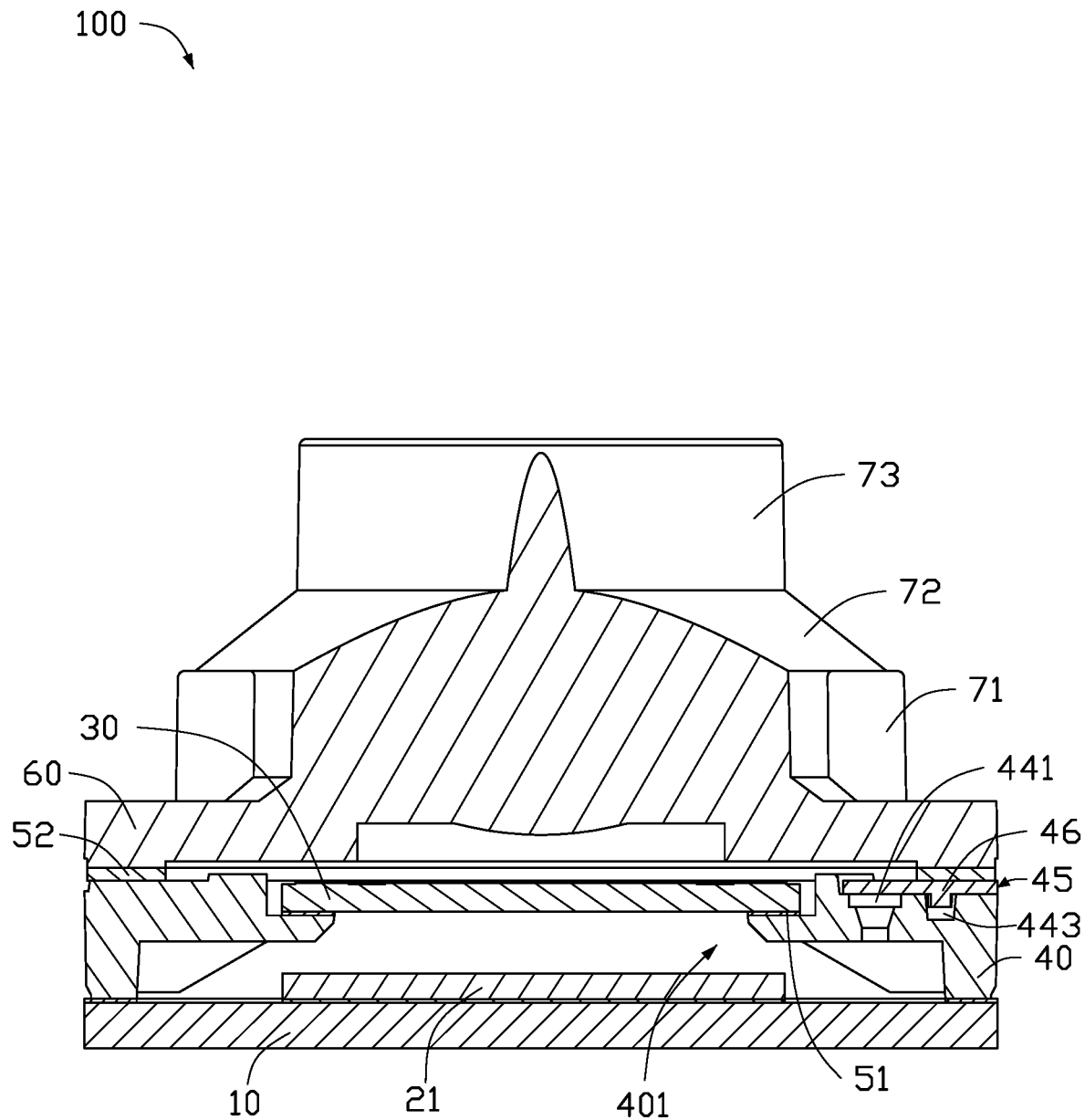
FIG. 4 is a cross-sectional view along line IV-IV of FIG. 1.
Figure 5:
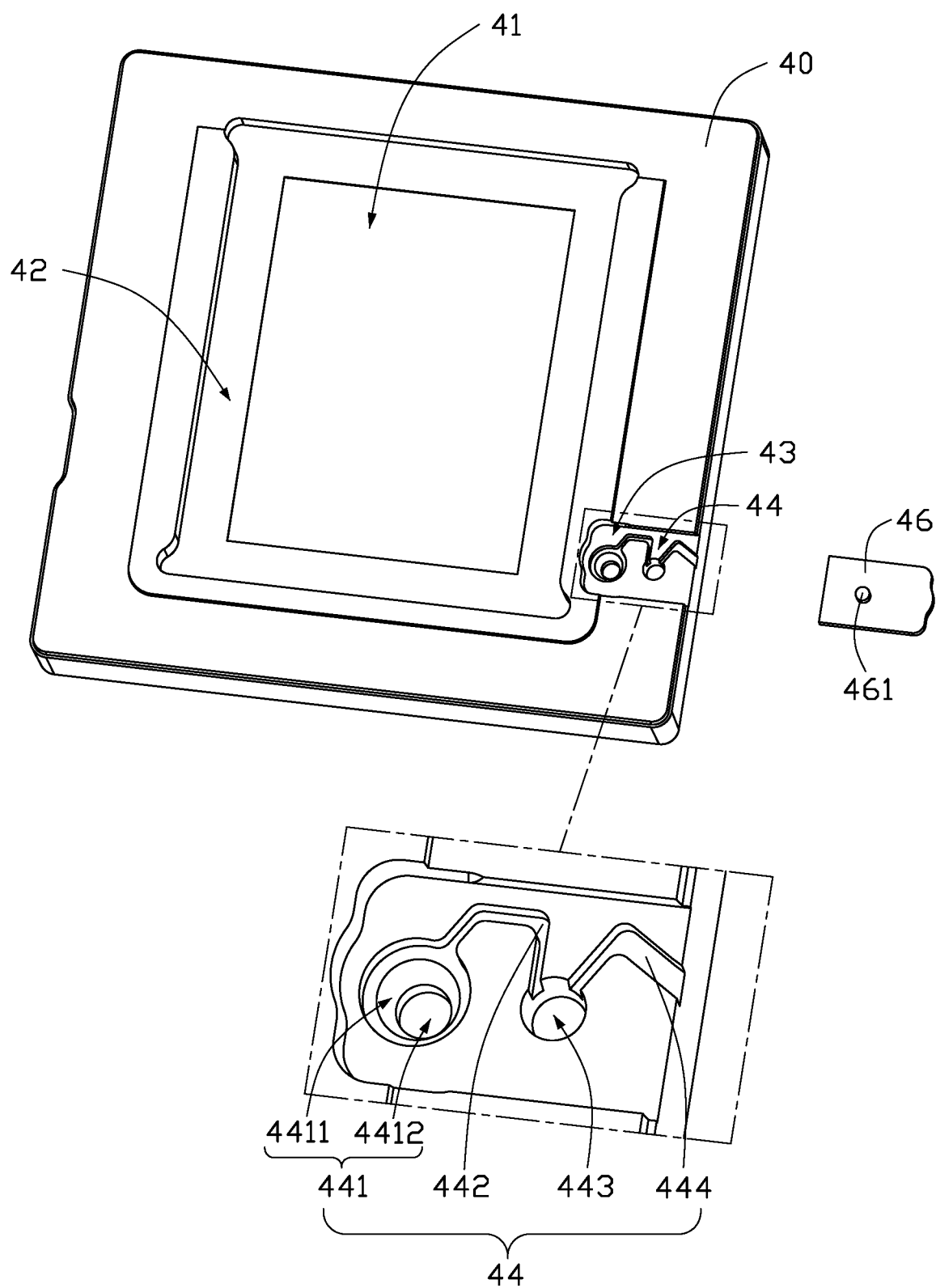
FIG. 5 is an isometric view of a lens base of the lens module of FIG. 1, and an enlarged view of part of the lens base.

FIGS. 4-5 illustrate that the support base 40 is adhered to the first surface of the first hard board portion 11 of the circuit board 10 by a first adhesive layer 50. The support base 40 and the photosensitive chip 21 are located on the same surface of the circuit board 10. The support base 40 has a hollow rectangular structure. The support base 40 defines a through hole 41. The support base 40 defines a first surface away from the electronic board 10. An area of the first surface of the support base 40 near the through hole 41, being concave, defines a first groove 42. An area of first surface of the support base 40 near the first groove 42, being concave, defines at least one second groove 43, the at least one second groove 43 is formed across a side wall of the through hole 41. The second groove 43 is substantially rectangular. A bottom of the second groove 43 defines at least one gas pressure relieving structure 44. The gas pressure relieving structure 44 comprises a gas pressure relieving hole 441, a first gas pressure relieving groove 442, a dust collecting hole 443, and a second gas pressure relieving groove 444. The gas pressure relieving hole 441 is formed across the support base 40. A central axis of the gas pressure relieving hole 441 is substantially parallel to the central axis of the through hole 41. The gas pressure relieving hole 441 is stepped. In detail, the gas pressure relieving hole 441 comprises a first gas pressure relieving hole 4411 and a second gas pressure relieving hole 4412. The first gas pressure relieving hole 4411 is defined on the first surface of the support base 40. The second gas pressure relieving hole 4412 is defined on a bottom portion of the first gas pressure relieving hole 4411, and communicates with the first gas pressure relieving hole 4411. A width of the first air pressure relieving hole 4411 is greater than the width of the second gas pressure relieving hole 4412. The dust collecting hole 443 is a blind hole, and defined on the first surface of the support base 40. The dust collecting hole 443 is configured to intercept and collect impurities entering into the lens module 100. The first gas pressure relieving groove 442 communicates with the dust collecting hole 443, and is configured to intercept impurities entering into the lens module 100. The first gas pressure relieving groove 442 can be straight or curved. In the present embodiment, the first gas pressure relieving groove 442 extends along a curving line. The second pressure relieving groove 444 joins the dust collecting hole 443 with the exterior, and defines an opening 45 on the junction between the second pressure relieving groove 442 and the outside. The second gas pressure relieving groove 444 is configured to intercept impurities entering into the lens module 100 through the opening 45. The second gas pressure relieving groove 444 can be straight or curved. In the present embodiment, the second gas pressure relieving groove 444 extends along a curving line. The material of the support base 40 can be metal or plastic. In the present embodiment, the material of the support base 40 is plastic.

The optical filter 30 is mounted in the first groove 42 of the support base 40, secured by a second adhesive layer 51, and arranged opposite to the photosensitive chip 21. The optical filter 30 is substantially rectangular. The optical filter 30 and the circuit board 10 seal opposite sides of the through hole 41 to form a receiving space 401. Both of the photosensitive chip 21 and the electric elements 22 are received in the receiving space 401.

The lens module 100 further comprises a gas pressure relieving cover 46. The gas pressure relieving cover 46 is matched with the second groove 43, and the number of gas pressure relieving covers 46 is equal to the number of second grooves 43. The gas pressure relieving cover 46 is substantially rectangular. An area of the surface of each gas pressure relieving cover 46 protrudes outwardly to form a protrusion 461. The protrusion 461 is matched with the dust collecting hole 443, so that the gas pressure relieving cover 46 can be received in the second groove 43. The protrusion 461 is received in the dust collecting hole 443.

The opening 45 communicates with the receiving space 401 via the gas pressure relieving hole 441, the first gas pressure relieving groove 442, the dust collecting hole 443, and the second gas pressure relieving groove 444. Heat which is generated by the electronic elements 22 is released through the gas pressure relieving hole 441, the first gas pressure relieving groove 442, the dust collecting hole 443, and the second gas pressure relieving groove 444 sequentially. Thereby, a temperature difference between the inner and outer surfaces of the optical filter 30 and a formation of water mist or small droplets on the internal surface of the optical filter 30 is avoided. The image quality of the lens module 100 is improved. The gas pressure relieving hole 441, the first gas pressure relieving groove 442, the dust collecting hole 443, and the second gas pressure relieving groove 444 also prevent external impurities from falling onto the photosensitive chip 21 received in the receiving space 401, so that the image quality of the lens module 100 is not compromised. In addition, the dust collecting hole 434 also collects some impurities to protect the image quality of the lens module 100.

The lens module 100 further comprises a second reinforcement 14. The second reinforcement 14 is arranged on the first surface of the circuit board 10 and coupled to the support base 40. The second reinforcement 14 and the support base 40 are located on the same surface of the circuit board 10. The second reinforcement 14 is configured to reinforce the mechanical strength of the circuit board 10, especially the mechanical strength of the flexible board portion 13.

The lens base 60 is adhered to the first surface of the support base 40 by a third adhesive layer 52. The lens base 60 is substantially rectangular. The lens base 60 defines a receiving hole 61. The material of the lens base 60 is metal or plastic. In an alternative embodiment, the material of the lens base 60 is aluminium alloy.

The lens 70 is received in the receiving hole 61 of the lens base 60. The lens 70 and the lens base 60 can be formed separately or as an integral unit. In the present embodiment, the lens 70 and the lens base 60 are integral. The lens 70 comprises a first lens portion 71, a second lens portion 72, and a third lens portion 73. The second lens portion 72 connects the first lens portion 71 and the third lens portion 73. Respective diameters of the first lens portion 71, the second lens portion 72, and the third lens portion 73 are decreased in succession. The first lens portion 71, the second lens portion 72, and the third lens portion 73 can be formed separately or as an integral unit. In the present embodiment, the first lens portion 71, the second lens portion 72, and the third lens portion 73 are formed as an integral unit.

Figure 6:
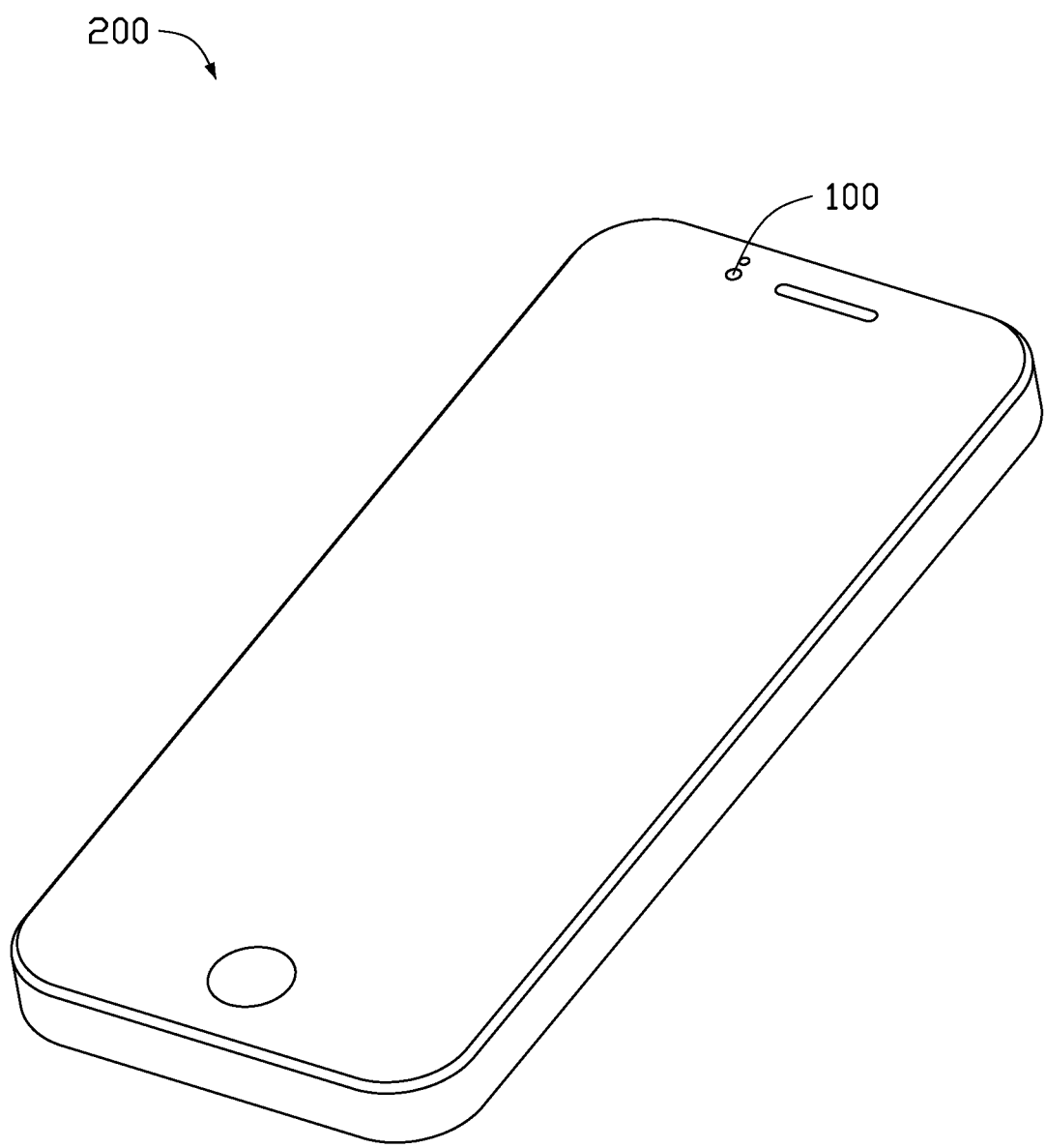
FIG. 6 is an isometric view of an embodiment of an electronic device including the lens module of FIG. 1.

FIG. 6 illustrates that the lens module 100 can be applied to various electronic devices with camera modules, such as mobile phones, wearable devices, computer devices, vehicles, or monitoring devices, etc. In the present embodiment, the lens module 100 is applied to a mobile phone 200.

The gas pressure relieving hole 441, the first gas pressure relieving groove 442, the dust collecting hole 443, and the second gas pressure relieving groove 444, which communicate with the receiving space 401, allow the release of working heat and the evaporation of any water vapour. The configuration of the gas pressure relieving hole 441, the first gas pressure relieving groove 442, the dust collecting hole 443, and the second gas pressure relieving groove 444 is such as to prevent the entry of external impurities and contamination of the photosensitive chip 21 received in the receiving space 401. The dust collecting hole 434 can also collect some impurities, so that the image quality of the lens module 100 is improved.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:
1. A lens module comprising:
a circuit board defining a first surface;
a support base adhered to the first surface of the circuit board by a first adhesive layer and defining a first surface away from the circuit board, a second surface facing the circuit board, and a side wall connecting the first and the second surfaces of the support base, the support base defining a through hole passing through the first and the second surfaces of the support base, wherein an area of the first surface of the support base near the through hole, being concave, defines a first groove communicating with the through hole; an area of the first surface of the support base near the first groove, being concave, defines a second groove, the second groove passing through the side wall, a bottom of the second groove defines a gas pressure relieving structure, the gas pressure relieving structure comprising:
- a gas pressure relieving hole being formed across the support base,
- a dust collecting hole being a blind hole,
- a first gas pressure relieving groove joining the gas pressure relieving hole and the dust collecting hole,
- a second gas pressure relieving groove joining the dust collecting hole and the exterior;

an optical filter secured in the first groove by a second adhesive layer;

a lens base adhered to the first surface of the support base by a third adhesive layer and defining a receiving hole; and a lens received in the lens base wherein the optical filter and the circuit board seal opposite sides of the through hole to form a receiving space, the gas pressure relieving hole communicates with the receiving space, heat generated in the receiving space is released through the gas pressure relieving hole, the first gas pressure relieving groove, the dust collecting hole, and the second gas pressure relieving groove sequentially.

2. The lens module of claim 1, wherein both of the first gas pressure relieving groove and the second gas pressure relieving groove extend along a curving line.

3. The lens module of claim 2, wherein lens module further comprises a gas pressure relieving cover which is matched with the second groove, each gas pressure relieving cover defines a protrusion protruding from a surface thereof, the protrusion is matched with the dust colleting hole.

4. The lens module of claim 1, wherein the gas pressure relieving hole comprises a first gas pressure relieving hole and a second gas pressure relieving hole, the first gas pressure relieving hole is defined on the bottom of the second groove, the second gas pressure relieving hole is defined on a bottom portion of the first gas pressure relieving hole and communicates with the first gas pressure relieving hole and the receiving space, a width of the first air pressure relieving hole is greater than the width of the second gas pressure relieving hole.

5. The lens module of claim 1, wherein the circuit board comprises
- a first hard board portion, a first surface of the first hard board portion carries a photosensitive chip and a plurality of electric elements,
- a second hard board portion, a first surface of the second hard board portion carries an electrical connecting portion, and
- a flexible board portion located between the first hard board portion and the second hard board portion,
- all of the photosensitive chip, the electric elements, and the electrical connecting portion are located on the first surface of the circuit board, both of the photosensitive chip and the electronic devices are received in the receiving space.

6. The lens module of claim 5, wherein the circuit board further defines a second surface opposite to the first surface of the circuit board, the lens module further comprises a first reinforcement arranged on the second surface of the circuit board.

7. The lens module of claim 5, wherein the lens module further comprises a second reinforcement, the second reinforcement is arranged on the first surface of the circuit board and coupled to the support base.

8. The lens module of claim 1, wherein the lens and the lens base are formed as an integral unit, the lens comprises a first lens portion, a third lens portion, and a second lens portion connecting the first lens portion and the third lens portion, respective diameters of the first lens portion, the second lens portion, and the third lens portion are decreased in succession.

9. An electronic device comprising a lens module, the lens module comprising:
- a circuit board defining a first surface;
- a support base adhered to the first surface of the circuit board by a first adhesive layer and defining a first surface away from the circuit board, a second surface facing the circuit board, and a side wall connecting the first and the second surfaces of the support base, the support base defining a through hole passing through the first and the second surfaces of the support base, wherein an area of the first surface of the support base near the through hole, being concave, defines a first groove communicating with the through hole; an area of the first surface of the support base near the first groove, being concave, defines a second groove, the second groove passing through the side wall, a bottom of the second groove defines a gas pressure relieving structure, the gas pressure relieving structure comprising:
  - a gas pressure relieving hole being formed across the support base,
  - a dust collecting hole being a blind hole,
  - a first gas pressure relieving groove joining the gas pressure relieving hole and the dust collecting hole,
  - a second gas pressure relieving groove joining the dust collecting hole and the exterior;

an optical filter secured in the first groove by a second adhesive layer;

a lens base adhered to the first surface of the support base by a third adhesive layer and defining a receiving hole; and a lens received in the lens base wherein the optical filter and the circuit board seal opposite sides of the through hole to form a receiving space, the gas pressure relieving hole communicates with the receiving space, heat generated in the receiving space is released through the gas pressure relieving hole, the first gas pressure relieving groove, the dust collecting hole, and the second gas pressure relieving groove sequentially.

10. The electronic device of claim 9, wherein both of the first gas pressure relieving groove and the second gas pressure relieving groove extend along a curving line.

11. The electronic device of claim 10, wherein lens module further comprises a gas pressure relieving cover which is matched with the second groove, each gas pressure relieving cover defines a protrusion protruding from a surface thereof, the protrusion is matched with the dust colleting hole.

12. The electronic device of claim 9, wherein the gas pressure relieving hole comprises a first gas pressure relieving hole and a second gas pressure relieving hole, the first gas pressure relieving hole is defined on the bottom of the second groove, the second gas pressure relieving hole is defined on a bottom portion of the first gas pressure relieving hole and communicates with the first gas pressure relieving hole and the receiving space, a width of the first air pressure relieving hole is greater than the width of the second gas pressure relieving hole.

13. The electronic device of claim 9, wherein the circuit board comprises
- a first hard board portion, a first surface of the first hard board portion carries a photosensitive chip and a plurality of electric elements,
- a second hard board portion, a first surface of the second hard board portion carries an electrical connecting portion, and
- a flexible board portion located between the first hard board portion and the second hard board portion,
- all of the photosensitive chip, the electric elements, and the electrical connecting portion are located on the first surface of the circuit board, both of the photosensitive chip and the electronic devices are received in the receiving space.

14. The electronic device of claim 13, wherein the circuit board further defines a second surface opposite to the first surface of the circuit board, the lens module further comprises a first reinforcement arranged on the second surface of the circuit board.

15. The electronic device of claim 13, wherein the lens module further comprises a second reinforcement, the second reinforcement is arranged on the first surface of the circuit board and coupled to the support base.

16. The electronic device of claim 9, wherein the lens and the lens base are formed as an integral unit, the lens comprises a first lens portion, a third lens portion, and a second lens portion connecting the first lens portion and the third lens portion, respective diameters of the first lens portion, the second lens portion, and the third lens portion are decreased in succession.

* * * * *